Jan. 23, 1923.
J. E. SHAFER.
BEARING CAGE.
FILED NOV. 23, 1921.
1,442,978.
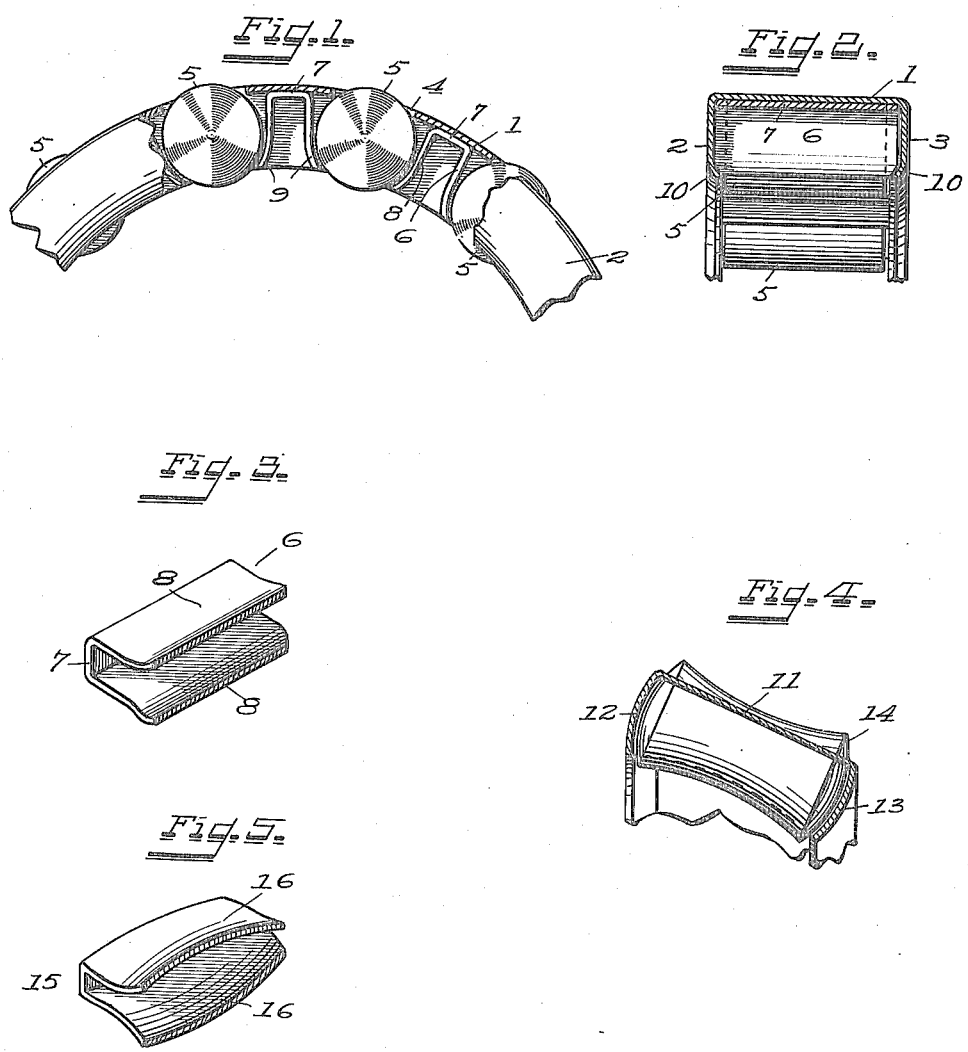
Inventor.
Julius E. Shafer.

Patented Jan. 23, 1923.

1,442,978

UNITED STATES PATENT OFFICE.

JULIUS E. SHAFER, OF CHICAGO, ILLINOIS.

BEARING CAGE.

Application filed November 23, 1921. Serial No. 517,197.

*To all whom it may concern:*

Be it known that I, JULIUS E. SHAFER, a citizen of the United States, and a resident of Chicago, in the county of Cook and State of Illinois, have invented certain new and useful Improvements in Bearing Cages, of which the following is a full, clear, and exact description, reference being had to the accompanying drawing, forming part of this specification.

My invention relates more particularly to cages for roller bearings, the cage being that portion of the bearing which carries the rolling elements and by means of which they are handled as a unit and maintained in proper spaced relation while in service, though it is capable of use for a variety of other purposes such as will be apparent to those skilled in the art to which my invention appertains.

One object of my invention is the provision of a cage in which the rolling elements of the bearings are mounted and spacing the rolling elements apart in the cage by spacing members which are loosely mounted in the structure though held against removal, the whole structure being such that when assembled, and mounted for operation, the mounting needs no "running in" to free the rolling elements.

Another object of my invention is to construct and arrange the parts forming the cage so that it will form a lubricant reservoir and feeding mechanism of relatively great capacity.

Other objects of my invention will appear and be described in the specification.

The novelty of my invention will be hereinafter more fully set forth and specifically pointed out in the claims.

In the accompanying drawing:

Fig. 1 is a side view of a cage, partly broken away, and showing my invention incorporated in its structure.

Fig. 2 is a sectional edge view of Fig. 1.

Fig. 3 is a perspective view of one of the spacing elements employed in a structure such as shown in Figs. 1 and 2.

Fig. 4 is a view corresponding to Fig. 2 showing a cage and roller wherein the roller is mounted at an angle to the axis of the bearing and is concave surfaced.

Fig. 5 is a perspective view of a spacing element such as would be used in a structure like that shown in Fig. 4.

The same numerals of reference are used to indicate identical parts in all the figures.

Referring more particularly to Figs. 1, 2, and 3, the cage comprises the barrel portion 1 provided with flanges 2 and 3, the face of the barrel portion being perforated as at 4 to permit the rolling elements 5 to project through the cage and contact with the outer race ring. A separating element 6 is mounted between each pair of rolling elements 5, the separating element being shown in perspective in Fig. 3 and consisting of the end portion 7 and the wings 8, the latter being slightly curved as shown more clearly at 9, Fig. 1, to conform to the curvature of the rolling elements 5.

The side flanges 2 and 3 of the cage are inwardly turned as at 10 to embrace the wings 8 to hold the spacing elements against moving inward radially, though the inwardly turned portions 10 of the flanges 2 and 3 do not engage the spacing elements 6 so tightly as to prevent their moving from contact with one roller to contact with its adjoining roller, the rollers, as well as the spacing element, being given sufficient clearance so that all of the rollers may act properly in the assembled bearing without being bound by any of the spacing elements.

In a structure such as shown in Figs. 4 and 5, the barrel portion 11 of the cage is cone-shaped and provided with the flanges 12 and 13, these flanges being preferably curved in cross section as shown, and the rollers 14 being preferably ball ended. The separating element used with such a structure is shown in perspective in Fig. 5 and comprises the portion 15 carrying a pair of curved wings 16, these wings being curved not only to conform to the diametral curvature of the roller, but to its longitudinal curvature as well, the wings 16 being brought nearly or quite in contact with each other at one end of the spacing element, though being spaced apart at the other end a sufficient distance to accommodate the increasing distance between the rollers due to their conical mounting. The spacing element of Fig. 5 is held in the cage of Fig. 4 by the curved flanges 12 and 13, the ends of the spacing element being of suitable contour to be engaged by the flanges 12 and 13.

In this structure, as well as in that previously described, the spacing elements are loosely mounted so that they may find their proper position in the assembly of the bearing and in its operation.

It will be seen from the above that I have produced a bearing cage which is exceedingly simple to construct and assemble, and one in which the parts can be easily and cheaply produced.

In addition, the structure when assembled, is such that all of the rolling elements of the bearing are free to find their proper position in the bearing assembly, and further that a cage constructed as above described, having the barrel portion adjacent the larger diameter thereof will carry a relatively large amount of lubricant which will be fed to the rolling elements gradually while the bearing is in service.

Having thus fully described my invention, I claim:

1. A bearing cage comprising a barrel portion provided with flanges and apertures, rolling elements projecting through the apertures for contact with a bearing race, and the spacing elements loosely mounted between the rolling elements and the flanges of the cage.

2. A bearing cage comprising a barrel portion provided with flanges and perforations, rolling elements between the flanges and projecting through the perforations for contact with a bearing race, spacing elements loosely mounted between the rolling elements and the flanges of the cage and held against removal by the cage flanges.

3. In a bearing cage the combination of a pair of side flanges connected together at their outer diameters by a barrel portion, struck up sheet metal spacing elements carried between the flanges and opening toward the axis of the cage thereby forming lubricant reservoirs as well as rolling element spacers.

JULIUS E. SHAFER.